United States Patent [19]

Walther

[11] Patent Number: 4,624,038

[45] Date of Patent: Nov. 25, 1986

[54] METHOD OF PRODUCING MOTOR VEHICLE WHEELS

[76] Inventor: William D. Walther, 267 Stonehaven Rd., Dayton, Ohio 45429

[21] Appl. No.: 532,745

[22] Filed: Sep. 16, 1983

[51] Int. Cl.$^4$ .............................................. B21H 1/02
[52] U.S. Cl. .............................. 29/159.01; 29/527.7; 72/85; 301/65
[58] Field of Search ............ 29/159.01, 159.1, 159 R, 29/527.7; 72/68, 84, 85; 301/65, 63

[56] References Cited

U.S. PATENT DOCUMENTS

| | | | |
|---|---|---|---|
| 2,086,488 | 7/1937 | Batie | 72/68 |
| 3,205,688 | 9/1965 | Paulton | 29/159.01 |
| 3,672,021 | 6/1972 | Schulte et al. | 29/159.01 |
| 3,822,458 | 7/1974 | Schulte et al. | 29/159.01 |

FOREIGN PATENT DOCUMENTS 2083765  3/1982  United Kingdom .

*Primary Examiner*—Howard N. Goldberg
*Assistant Examiner*—P. W. Echols

*Attorney, Agent, or Firm*—Jacox & Meckstroth

[57] ABSTRACT

A heat treatable aluminum base alloy is cast in a permanent mold to form an annular preform having an annular disc portion projecting inwardly from first and second annular wing portions extending axially in opposite directions from the disc portion. The preform is mounted on rotatable mandrels having peripheral surfaces spaced inwardly from the corresponding wing portions, and a forming roller presses each wing portion inwardly against the corresponding mandrel surface while the mandrels and preform are rotating to shear-form each wing portion into a substantially thinner and wider rim portion conforming to the contour of the corresponding mandrel surface. In one embodiment, the disc portion of the preform is engaged by a forming roller and a pressure roller both of which move radially inwardly while the disc portion and adjacent mandrel are rotating to shear-form the disc portion inwardly into a thinner and radially wider disc portion. In another embodiment, an outer part of the disc portion is shear-formed by a forming roller fed axially and outwardly towards the wing portions.

4 Claims, 11 Drawing Figures

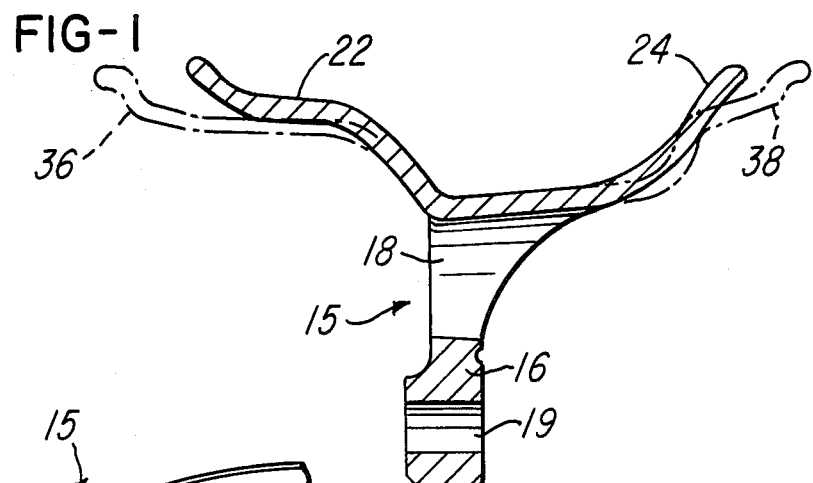
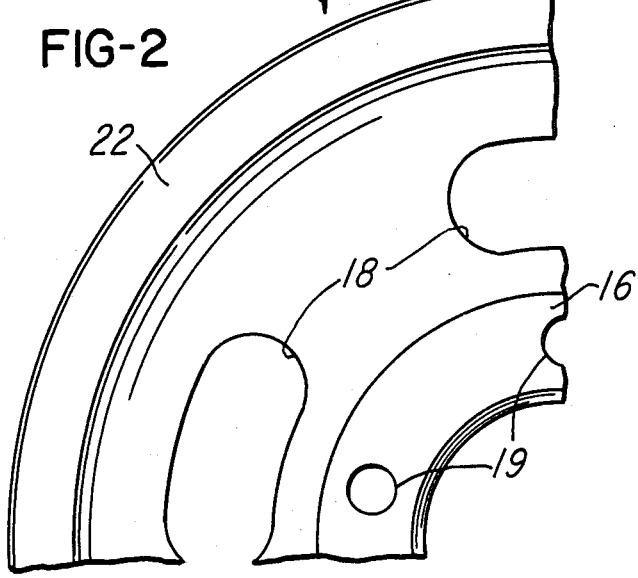
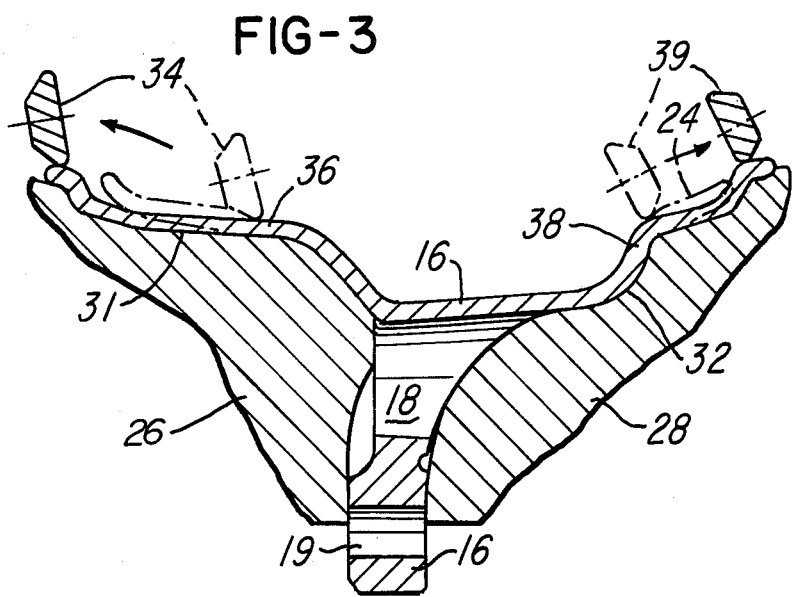

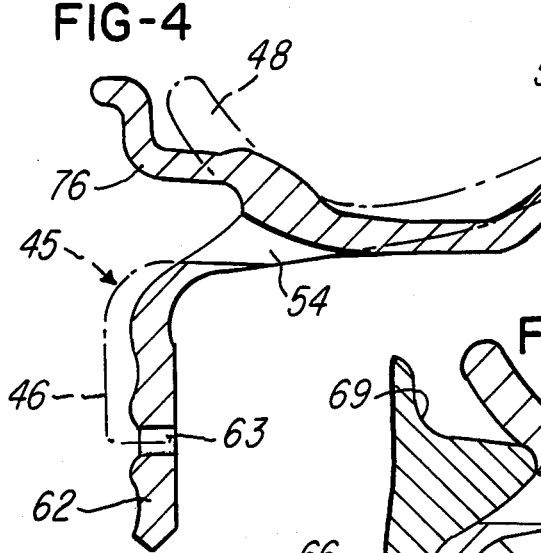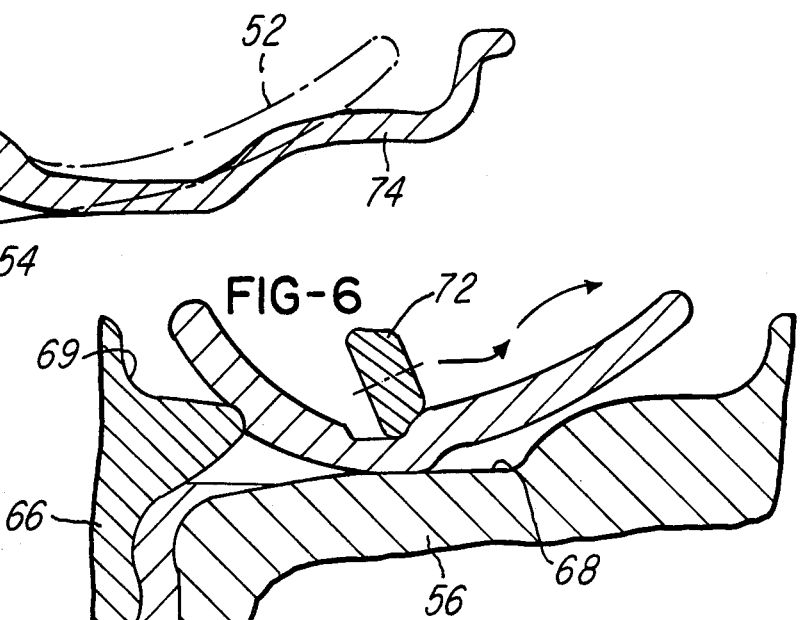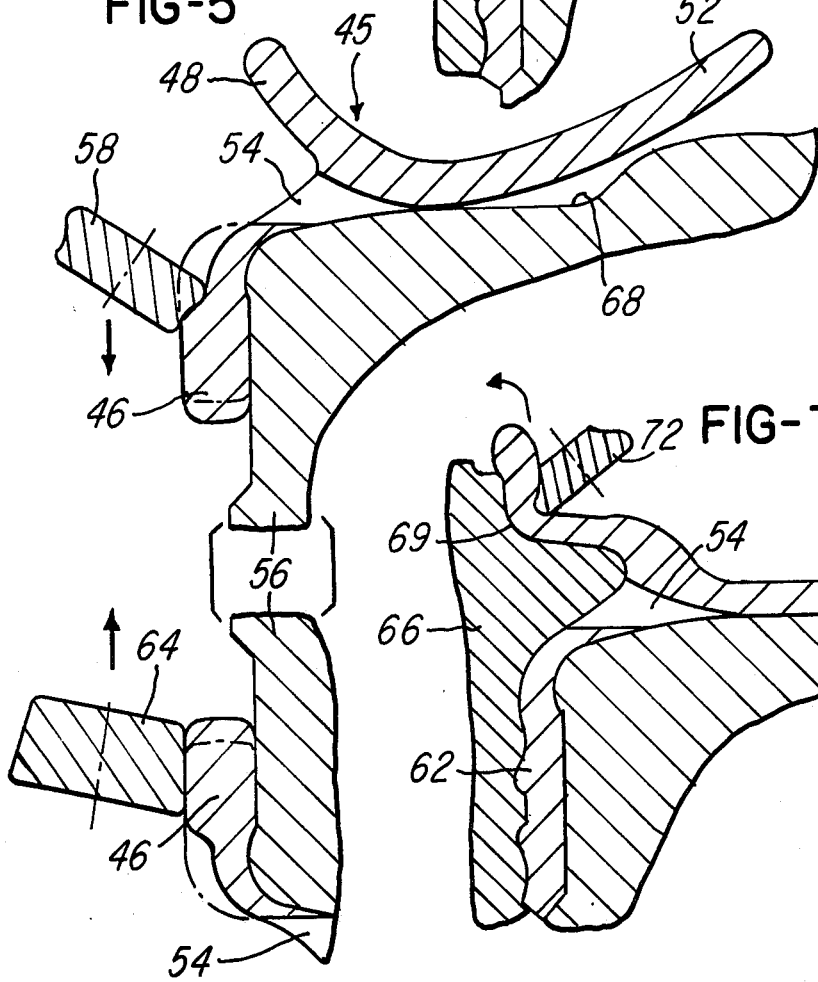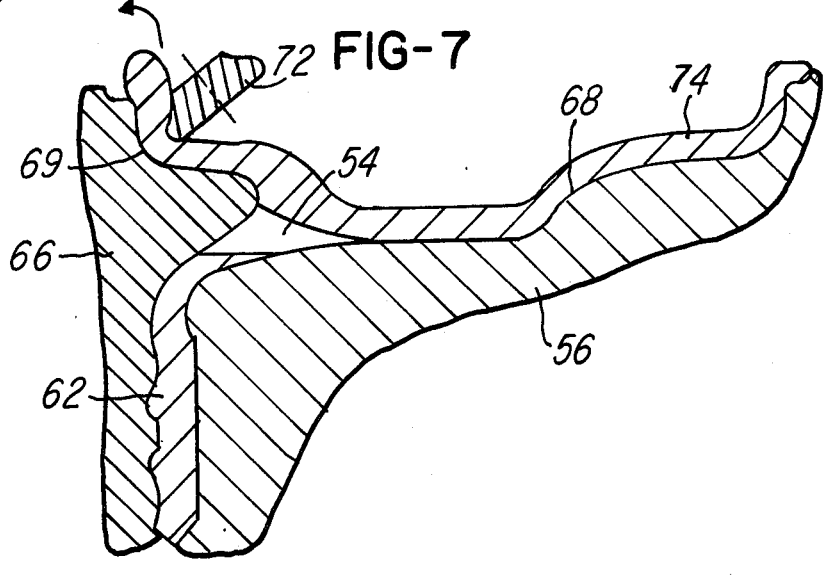

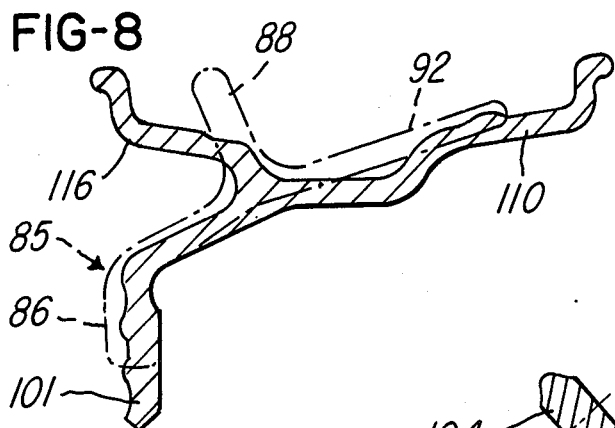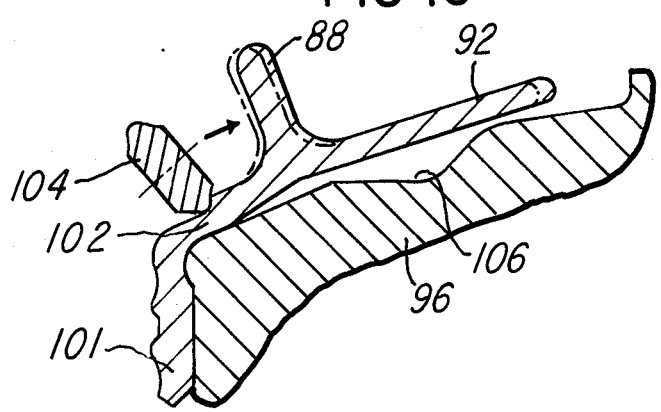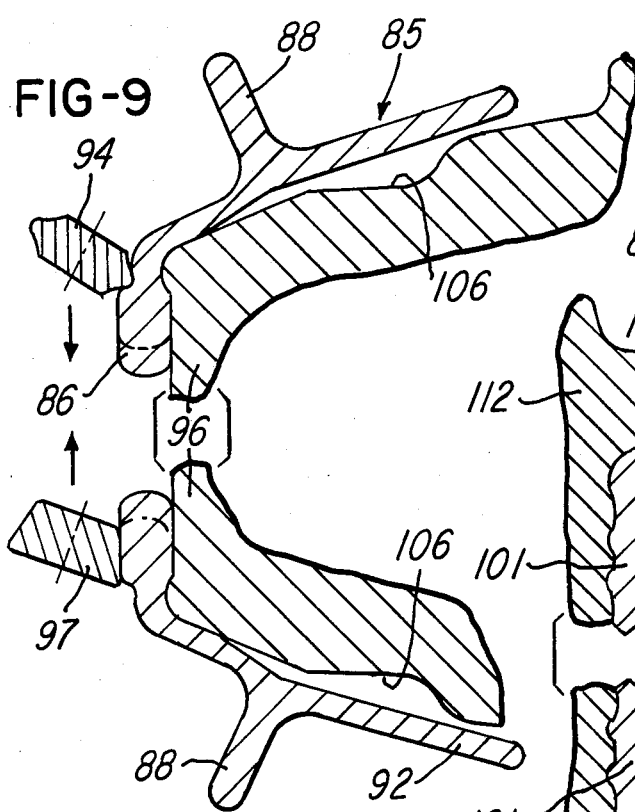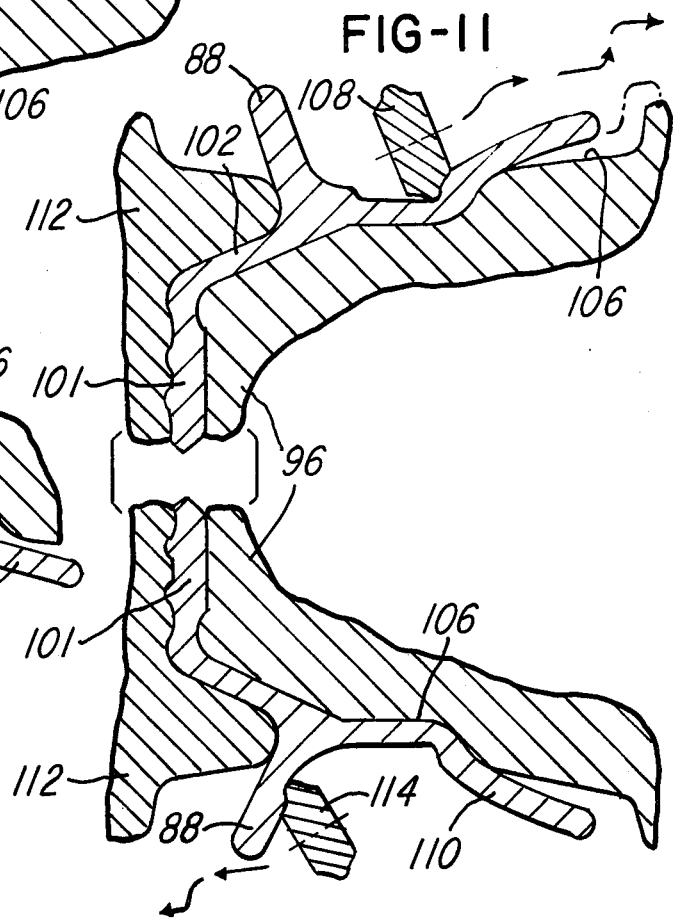

4,624,038

METHOD OF PRODUCING MOTOR VEHICLE WHEELS

BACKGROUND OF THE INVENTION

In the production of motor vehicle wheels of the type which provide a decorative appearance and a relatively light weight, it is common to cast a light weight metal such as an aluminum base alloy or a magnesium base alloy to form a cast wheel of the desired configuration. The cast wheel is then machined to form the final dimensions for the disc portion and the surrounding rim portion. Lighter weight decorative wheels have also been produced by forging an aluminum or magnesium based alloy into a plate-like preform which is then shear-formed to produce rim portions having the desired contour or configuration. For example, U.S. Pat. No. 3,672,021 discloses a method of producing a wheel wherein a cylindrical cast blank of aluminum alloy is forged under heat and pressure to obtain a plate-shaped blank with ribs connected to a thickened rim portion. The rim portion is then divided into two portions which are shear-formed into the rim portions of the wheel. The forged disc portion of the blank is machined to the desired final dimensions of the disc portion of the wheel.

It has been determined that the above shear-forming method for producing forged and machined light weight decorative wheels for motor vehicles results in a wheel having a high strength-weight ratio, but the cost of producing the wheel using a forged preform is high compared to the cost of producing a cast and machined wheel. However, the cast and machined wheel is heavier and has a relatively low strength-weight ratio.

SUMMARY OF THE INVENTION

The present invention is directed to an improved method of producing a motor vehicle wheel from a light weight metal alloy such as an aluminum or magnesium base alloy and which provides for maximizing the strength-weight ratio of the wheel while minimizing the volume of metal used in producing the wheel. In addition, the method of the invention minimizes the time required for producing a decorative light weight wheel and provides for obtaining more uniform strength in the shear-formed portion of the wheel in comparison to the cast structure of a machined cast wheel.

In accordance with preferred embodiments of the invention, the above features and advantages are provided by casting an aluminum base alloy in a permanent mold to form an annular preform having an annular disc portion projecting inwardly from first and second annular wing portions extending axially in opposite directions from the disc portion. The cast preform is mounted on rotatable mandrels which engage the disc portion and have peripheral surfaces spaced radially inwardly from the corresponding wing portions of the preform. A forming roller presses each wing portion inwardly against the corresponding mandrel surface while the mandrels and preform are rotating to shear-form each wing portion outwardly in an axial direction to a substantially thinner and wider rim portion conforming to the contour of the corresponding mandrel surface. The disc portion of the preform may also be shear-formed against a mandrel by a forming roller which moves radially inwardly on the disc portion while a circumferentially spaced pressure roller also moves inwardly on the disc portion to hold the shear-formed disc portion against the forming mandrel.

Other features and advantages of the invention will be apparent from the following description, the accompanying drawings and the appended claims.

BRIEF DESCRIPTION OF THE DRAWINGS

FIG. 1 is a radial section through a cast preform produced in accordance with the invention and showing the configuration of the annular wing portions and the corresponding annular rim portions shear-formed from the wing portions;

FIG. 2 is an elevational view of an arcuate section of the preform shown in FIG. 1;

FIG. 3 is a radial section through the wheel shown in FIG. 1 and illustrating diagrammatically the shear-forming operations of the annular wing portions into the corresponding rim portions, of the wheel;

FIG. 4 is a radial section similar to FIG. 1 of another wheel constructed in accordance with the invention and illustrating by dotted lines the cast preform used for producing the wheel;

FIGS. 5-7 illustrate the shear-forming operations to produce the rim portions and disc portion of the wheel shown in FIG. 4;

FIG. 8 is a radial section through another wheel produced in accordance with the invention and illustrating by dotted lines the shape of the cast preform used to produce the wheel: and FIGS. 9-11 illustrate diagrammatically the shear-forming steps for converting the cast preform into the wheel shown in FIG. 8.

DESCRIPTION OF THE PREFERRED EMBODIMENTS

FIG. 1 shows a radial cross-section through an annular preform 15 which is cast from a heat treatable aluminum base alloy. The preform 15 includes a disc portion 16 having circumferentially spaced arcuate slots 18 and circumferentially spaced holes 19 for receiving wheel mounting bolts (not shown). The disc portion 16 of the preform 15 projects radially inwardly and integrally connects annular wing portions 22 and 24 which project in opposite axial directions from the disc portion 16. The annular preform 15 is cast within a permanent mold, and the aluminum base alloy provides the characteristics of a good response to heat treatment and good mechanical properties such as a relatively high yield strength fatigue strength and ductility. The aluminum U.S. alloys A356 and A357 include silicon and magnesium and will provide acceptable preforms. The alloy A356 includes 6.5-7% silicon, 0.2-0.4% magnesium, a maximum of 0.15% iron. a maximum of 0.1% copper, 0.1-0.2% titanium, 0.008-0.015% boron and a silicon eutectic modifier such as strontium, sodium or antimony. The aluminum alloy A357 contains slightly more magnesium within the range of 0.4-0.7% and also includes beryllium within the range of 0.04-0.07%. These aluminum base alloys have relatively high content of silicon which is added to improve casting characteristics but which reduces the ductility and the corrosion resistance of the metal.

As shown in FIG. 3, the cast preform 15 is placed or clamped between rotatable mandrels 26 and 28 which grip the preform for rotation and form part of a shear-forming machine (not shown). The mandrel 26 has an outer peripheral surface 31, and the mandrel 28 has an outer peripheral surface 32 and the surfaces 31 and 32 are formed to predetermined contours according to the desired shape of the wheel. As diagrammatically illustrated in FIG. 3, the annular wing portion 22 of the cast preform 15 is shear-formed by a roller 34 which is shifted or moved axially away from the disc portion 16 along a predetermined path which causes the wing portion 22 to be substantially reduced in thickness and conform to the surface 31 until the wing portion 22 is formed into the substantially wider rim portion 36. The roller 34 is moved outwardly or axially along the predetermined path while the mandrels 26 and 28 and the preform 15 are rotating. In the same manner, the wing portion 24 is shear-formed into a substantially thinner and wider rim portion 38 by moving a shear-forming roller 39 outwardly and axially along a predetermined path. The annular wing portions 22 and 24 may be shear-formed simultaneously into the corresponding annular rim portions 36 and 38 or the wing portions may be shear-formed in succession.

It has been determined that an aluminum alloy with a silicon content lower than the content mentioned above, is more desirable for the shear-forming operations. While a lower percentage of silicon reduces the casting characteristic by some degree, a lower silicon content is preferred for the shear-forming operations. One aluminum base alloy composition which has provided satisfactory casting characteristics and also improved shear-forming characteristics included silicon within the range of 1.0–6.0% and magnesium within the range of 0.35–0.65%. The percentages of iron, copper, titanium, boron and beryllium remain the same as above mentioned U.S. alloy A357. This composition may also include a small amount of sodium, strontium or antimony. By further limiting the silicon content of the aluminum base alloy described above to the 1–4% range, further enhancement of shear forming characteristics is obtained. in addition, the silicon content limitation serves to improve corrosion resistance of the resultant part, and especially the stress corrosion fatigue properties of the part.

FIGS. 4–7 show a modified method of making or producing a motor vehicle wheel in accordance with the invention. In accordance with this embodiment, a cast aluminum base preform 45 includes a relatively thick disc portion 46 which projects inwardly from oppositely projecting annular wing portions 48 and 52. The wing portions are integrally connected by the disc portion 46 which is provided with circumferentially spaced slots 54 for reducing weight of the wheel and for providing a pleasing appearance.

As shown in FIG. 5, the annular preform 45 is placed on a rotatable mandrel 56 of a shear-forming machine, and a shear-formng roller 58 is moved or fed radially inwardly along a predetermined path while the preform and mandrel are rotating to shear-form the disc portion 46 into a substantially thinner and radially wider disc portion 62. The disc portion is subsequently drilled to form bolt mounting holes 63 (FIG. 4). While the shear-forming roller 58 is moving radially inwardly on the disc portion 46 of the preform 45 to form the thinner disc portion 62, a pressure or hold-down roller 64 is also fed radially ahead of the roller 58 in engagement with the disc portion 46 to assure that the disc portion 62 remains in pressure contact with the mandrel 56 as the disc portion is shear-formed. The pressure roller 64 has been found to be highly desirable to assure the desired configuration or contour of the inwardly shear-formed disc portion 62.

After the disc portion 62 is shear-formed on the rotatable mandrel 56, the partially shear-formed cast preform 45 is gripped between the mandrel 56 and another rotatable mandrel 66 which are provided with corresponding predetermined peripheral surfaces 68 and 69. While the preform 45 is rotating with the mandrels 56 and 66, a forming roller 72 shear-forms the annular wing portion 52 against the surface 68 to produce the substantially thinner and wider annular rim portion 74 corresponding to the shape oF the outer surface 68 of the mandrel 56. As illustrated in FIG. 6, the roller 72 is fed outwardly or axially away from the disc portion 62 along a predetermined or preprogrammed path corresponding to the surface 68 for converting the wing portion 52 into the rim portion 74. As shown in FIG. 7, the wing portion 48 is similarly shear-formed against the peripheral surface 69 of the mandrel 66 to convert the annular wing portion 48 into the annular rim portion 76 conforming to the peripheral surface 65 of the rotatable mandrel 66.

In all of the embodiments of the invention, the wing portions are reduced in thickness by about 25% to 50% to form the corresponding thinner and wider rim portion. Prior to the shear-forming operations in each embodiment, the annular preform is heat treated or annealed by heating the preForm to a temperature of about 750° to 800° F. and then slowly cooling the preform. As an alternative to the annealing operation, the preform may be heated to approximately 500° F. or higher in preparation for the shear-forming operations. As a result, the shear-forming operation causes intermetallic compounds within the cast aluminum alloy preform to become more finely and uniformly dispersed in the aluminum alloy matrix. The shear-forming operation also results in producing a fine densified grain size or structure after subsequent heat treating operations. A typical heat treatment practice for the Al-Si-Mg system described consists of a solution treatment at 1000° F. for four hours, followed by a hot water quench and then an aging treatment at 310° F. for eight hours.

FIGS. 8–11 illustrate another modified method of producing a motor vehicle wheel in accordance with the invention. This method includes steps similar to the steps described above in connection with the production of the wheel shown in FIGS. 4–7. In this embodiment, a cast annular preform 85 includes a relatively thick disc portion 86 which projects inwardly from integrally connected annular wing portions 88 and 92. As shown in FIG. 9, the disc portion 86 is shear-formed inwardly by a forming roller 94 while the preform 85 is retained on a rotatable mandrel 96 and the disc portion 86 is engaged by an inwardly moving pressure roller 97. After the disc portion 86 is shear-formed into a substantially thinner and radially wider disc portion 101, an upper section of the disc portion 86 is shear-formed to a substantially thinner disc portion 102 by a forming roller 104 which is shifted or fed axially and outwardly along a predetermined path corresponding to the outer surface 106 of the mandrel 96. During this operation, a pressure roller may be used to hold down the wing portion 92.

After the disc portion 102 is shear-formed, another forming roller 108 (FIG. 11) is fed axially along a predetermined path to shear-form the wing portion 52 into a substantially thinner and wider rim portion 110 conforming to the contour of the mandrel surface 106. After this shear-forming operation, another rotatable annular mandrel 112 is brought into engagement with the disc portion 102, and the wing portion 88 is shear-formed by an axially moving forming roller 114 to produce or form a substantially thinner and wider rim portion 116 while the mandrels 96 and 112 and the wheel are rotating on the axis of the mandrels and wheel.

It has been determined that the production of a motor vehicle wheel in accordance with the invention as described above in connection with FIGS. 1–11 provides for producing a wheel having a high strength/weight ratio and for minimizing the volume of light weight alloy used in producing the wheel so that the cost of producing the wheel is significantly reduced. By first casting an aluminum or magnesium base alloy within a permanent mold to produce an annular preform and then shear-forming the preform according to the steps described above, followed by heat treating the shear-formed part by the solution treatment, quench. and aging treatment described earlier, a motor vehicle wheel is produced from a light weight material with a fine grain structure. The fine densified grain structure results in a wheel with uniformly high strength and ductility, which is especially desirable in the rim portions of the wheel so that the total mass of the wheel may be minimized.

While the method steps herein described constitute preferred embodiments oF the invention, it is to be understood that the invention is not limited to these precise method steps, and that changes may be made therein without departing from the scope and spirit of the invention as defined in the appended claims.

The invention having thus been described, the following is claimed:

1. An improved method of producing a motor vehicle wheel adapted to receive an inflatable tire, comprising the steps of forming a heat treatable light weight metal alloy into an annular preform having an annular disc portion projecting inwardly from a first annular wing portion and a second annular wing portion projecting axially in opposite directions from the disc portion, mounting the preform on a rotatable mandrel having a predetermined generally radial surface, pressing a forming roller axially into the disc portion in contact with the mandrel surface while the preform and mandrel are rotating, engaging the disc portion with a pressure roller disposed radially inwardly of the forming roller and spaced circumferentially from the forming roller engaging the disc portion, moving both the forming roller and the pressure roller radially inwardly and simultaneously towards the axis of the preform to shear-form and extrude the disc portion inwardly into a thinner and radially wider disc portion, positioning the preform with the disc portion between rotatable mandrels having predetermined contoured peripheral surfaces spaced radially inwardly from the wing portions, pressing a forming roller inwardly into each wing portion of the preform while the mandrel and preform are rotating and while moving the forming roller away from the disc portion along a predetermined path to press each wing portion against the peripheral surface of the corresponding mandrel and to shear-form the wing portion into a thinner and wider rim portion conforming to the contoured peripheral surface of the corresponding mandrel, and removing the shear-formed disc portion and rim portions from the mandrels.

2. A method as defined in claim 1 and including the steps of annealing the cast preform by heating the preform to at least 700° F. and then slow-cooling the preform prior to mounting the preform on the mandrels.

3. A method as defined in claim 1 and including the step of heating the preform to at least 450° F. prior to shear-forming the disc portion and each wing portion with a forming roller.

4. A method as defined in claim 1 and including the step of pressing a forming roller inwardly into an outer section of the disc portion in contact with a mandrel while the preform and mandrel are rotating and while moving the forming roller and pressure roller axially and radially outwardly relative to the axis of the preform to shear-form the outer section of the disc portion into a thinner and wider section.

* * * * *

UNITED STATES PATENT AND TRADEMARK OFFICE
CERTIFICATE OF CORRECTION

PATENT NO. : 4,624,038
DATED : November 25, 1986
INVENTOR(S) : William D. Walther It is certified that error appears in the above-identified patent and that said Letters Patent are hereby corrected as shown below:

```
Column 1, line 50, cancel "inventlon" and insert --invention--.
Column 2, line 49, after "strength" (first occurrence) insert --,--.
Column 2, line 53, cancel "0.1%" and insert --0.2%--.
Column 2, line 58, cancel "wlthin" and insert --within--.
Column 3, line 37, cancel "in" and insert --In--.
Column 3, line 53, cancel "shear-formng" and insert --shear-forming--.
Column 4, line 10, cancel "oF" and insert --of--.
Column 4, line 19, cancel "65" and insert --69--.
Column 4, line 26, cancel "preForm" and insert --preform--.
Column 4, line 64, cancel "52" and insert --92--.
Column 5, line 4, cancel "whlle" and insert --while--.
Column 5, line 6, cancel "productlon" and insert --production--.
Column 5, line 7, cancel "vehlcle" and insert --vehicle--.
Column 5, line 8, cancel "wlth" and insert --with--.
Column 5, line 13, cancel "wlthin" and insert --within--.
Column 5, line 26, cancel "oF" and insert --of--.
```

In The Claims

Column 6, line 26, cancel "annealing the cast preform by".

Signed and Sealed this

Seventeenth Day of February, 1987

*Attest:*

DONALD J. QUIGG

*Attesting Officer*     *Commissioner of Patents and Trademarks*